(12) United States Patent
Grapov et al.

(10) Patent No.: US 9,405,087 B2
(45) Date of Patent: Aug. 2, 2016

(54) LASER HEAD ASSEMBLY FOR LASER PROCESSING SYSTEM

(71) Applicants: Yuri Grapov, Sutton, MA (US); Michael Digiantommaso, Oxford, MA (US)

(72) Inventors: Yuri Grapov, Sutton, MA (US); Michael Digiantommaso, Oxford, MA (US)

(73) Assignee: IPG Photonics Corporation, Oxford, MA (US)

( * ) Notice: Subject to any disclaimer, the term of this patent is extended or adjusted under 35 U.S.C. 154(b) by 106 days.

(21) Appl. No.: 14/355,801

(22) PCT Filed: Oct. 1, 2012

(86) PCT No.: PCT/US2012/058296
§ 371 (c)(1),
(2) Date: May 1, 2014

(87) PCT Pub. No.: WO2013/049813
PCT Pub. Date: Apr. 4, 2013

(65) Prior Publication Data
US 2014/0285900 A1    Sep. 25, 2014

Related U.S. Application Data

(60) Provisional application No. 61/542,156, filed on Oct. 1, 2011.

(51) Int. Cl.
| | |
|---|---|
| *G02B 27/30* | (2006.01) |
| *G02B 7/04* | (2006.01) |
| *B23K 26/04* | (2014.01) |
| *B23K 26/14* | (2014.01) |
| *B23K 26/20* | (2014.01) |
| *B23K 26/38* | (2014.01) |
| *G02B 7/02* | (2006.01) |
| *G02B 7/09* | (2006.01) |

(52) U.S. Cl.
CPC . *G02B 7/04* (2013.01); *B23K 26/04* (2013.01); *B23K 26/1476* (2013.01); *B23K 26/20* (2013.01); *B23K 26/38* (2013.01); *B23K 26/707* (2015.10); *G02B 7/023* (2013.01); *G02B 7/09* (2013.01); *G02B 27/30* (2013.01)

(58) Field of Classification Search
CPC .... B23K 26/04; B23K 26/1476; B23K 26/20; B23K 26/38; B23K 26/422; G02B 27/30; G02B 7/023; G02B 7/04; G02B 7/09
USPC .......................................... 359/641
See application file for complete search history.

(56) References Cited

U.S. PATENT DOCUMENTS

| | | | |
|---|---|---|---|
| 4,618,758 A | 10/1986 | Gilli | |
| 5,702,622 A | 12/1997 | Schubert | |
| 5,837,965 A * | 11/1998 | Mosca | B23K 26/02 219/121.6 |
| 6,822,187 B1 | 11/2004 | Hermann | |
| 8,416,516 B2 * | 4/2013 | Spoerl | B23K 26/02 359/694 |
| 2011/0075247 A1 | 3/2011 | Chui | |

* cited by examiner

*Primary Examiner* — Thomas K Pham
*Assistant Examiner* — Vipin Patel
(74) *Attorney, Agent, or Firm* — Yuri Kateshov, Esq.; Timothy J. King, Esq.

(57) ABSTRACT

The present invention relates to a head assembly for a laser processing system, preferably a fiber laser processing system. An assembly system allows a secure and a slidingly focusing displacement of a focusing lens assembly relative to a beam path in a laser processing system. The assembly system provides easy replacement of desired focusing lens assemblies. Adaptive modifications are operative to provide computerized processor control of the focusing displacement and detection of an installed optical assembly and position thereof.

13 Claims, 7 Drawing Sheets

LASER HEAD ASSEMBLY FOR LASER PROCESSING SYSTEM

BACKGROUND OF THE INVENTION

1. Field of the Invention

The present invention relates to a head assembly for a laser processing system. More particularly, the present invention provides an assembly system enabling replaceable and displaceable focusing optics relative to a beam path it a laser processing system.

2. Description of the Related Art

Industrial applications provide terminal heads for laser systems. These terminal heads have involved in the past a focusing optical system and a lens insert that are permanently connected to each other and prevent aligning of the focusing optical system relative to the beam path following insertion.

Other conventional constructions involve separate focusing optical systems and lens inserts spaced between a collimator assembly and a nozzle assembly in a terminal head having swappable, adaptor plates required for differently sized focusing optical systems, for example as shown in U.S. Pat. No. 5,702,622, the contents of which are fully incorporated herein by reference.

In the focusing optical system of U.S. Pat. No. 5,702,622, an opening is required between the ambient atmosphere and a spinning rotational adjustment of a focus lens in the focusing optical system along a beam pathway. This construction mandates separate replacement of the combined spinning rotational adjustment and focusing lens system with the detriments of continuous exposure to ambient atmosphere and the inaccuracies of direct digital manual adjustment.

ASPECTS AND SUMMARY OF THE INVENTION

In response to at least one of the above-noted concerns, the present invention relates to a head assembly for a laser processing system, preferably a fiber laser processing system. The assembly system allows a secure and a slidingly focusing displacement of a focusing lens assembly relative to a beam path in a laser processing system.

Another aspect of the present invention provides easy replacement of desired focusing lens assemblies with in a slidingly adjustable lens module.

An alternative refinement of the proposed invention enables a computerized processor control operative for electronic control of the focusing displacement of the lens assembly.

A further alternative refinement of the proposed invention is operative to provide remote detection of an installed optical assembly during a use.

According to a further alternative embodiment of the present invention, there is provided a head assembly for a laser processing system, comprising; an operative lens assembly interposed along a beam path of the laser, a monolithic cover plate securing the operative lens assembly in a sealed arrangement with a hounded lens receiver bounding the beam path, an adjustment system operative to adjust the lens assembly along a direction transverse to the beam path in the sealed arrangement therewith, a focus system operative to focus the lens assembly in an axial direction parallel to the beam path in the sealed arrangement, and the lens assembly includes a lens barrel in a relative sliding arrangement with a lens module replaceably securing a lens cell in the beam path.

According to another alternative embodiment of the present invention there is provided a head assembly, wherein; the adjustment system further comprises; a first and a second pivot arm pivotably secured to the cover plate about a common pivot axis parallel to the beam path, means for remotely pivoting selected ones of the pivot arms external to the bounded lens receiver, and means for releasably urging the lens barrel toward the cover plate and into an urged contact along a barrel support section on each respective the pivot arm.

According to a further refinement of the invention, an adjustment system further comprises; means for aligning the lens barrel relative to each respective barrel support section along respective the pivot arms and parallel to the beam path.

According to a further refinement of the present invention, there is provided the means for remotely pivoting includes means for remotely driving at least one of the respective barrel supports about the common pivot axis in the sealed arrangement and operative to drive the lens assembly relative to the beam path.

According to a further refinement of the present invention there is provided a focus system further comprising a drive rack assembly fixed on a surface of the lens barrel, the drive rack assembly operative to drive a pin extending from the drive rack assembly through a translation slot in the lens barrel in a sliding direction along the beam path, and the pin releasably secured to the lens module effective to transfer a translation of the pin sliding to the lens module thereby translating the lens module along the beam path in a focus direction therewith.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
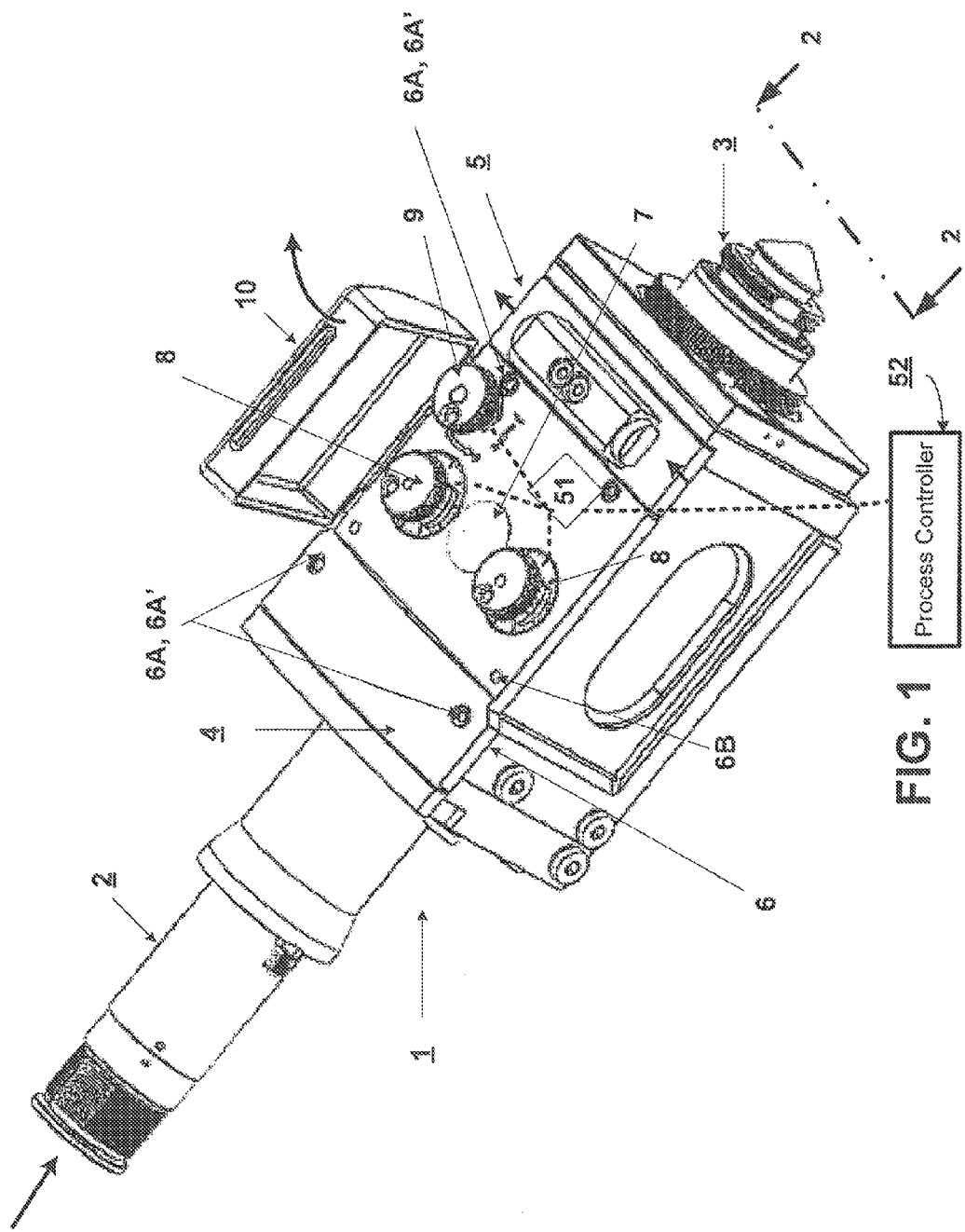
FIG. 1 is a perspective view of a head assembly for a laser processing system.

Reference will now be made in detail to embodiments of the invention. Wherever possible, same or similar reference numerals are used in the drawings and the descriptions refers to the same or like parts or steps. The drawings are in simplified or schematic form and are not to scale. For convenience and clarity only, directional (up stream/down stream, etc.) or motional (formal/back/pivot, etc.) terms are used with respect to the drawings. These and similar directional terms should not be construed to limit the scope of the invention in any manner.

Figure 2:
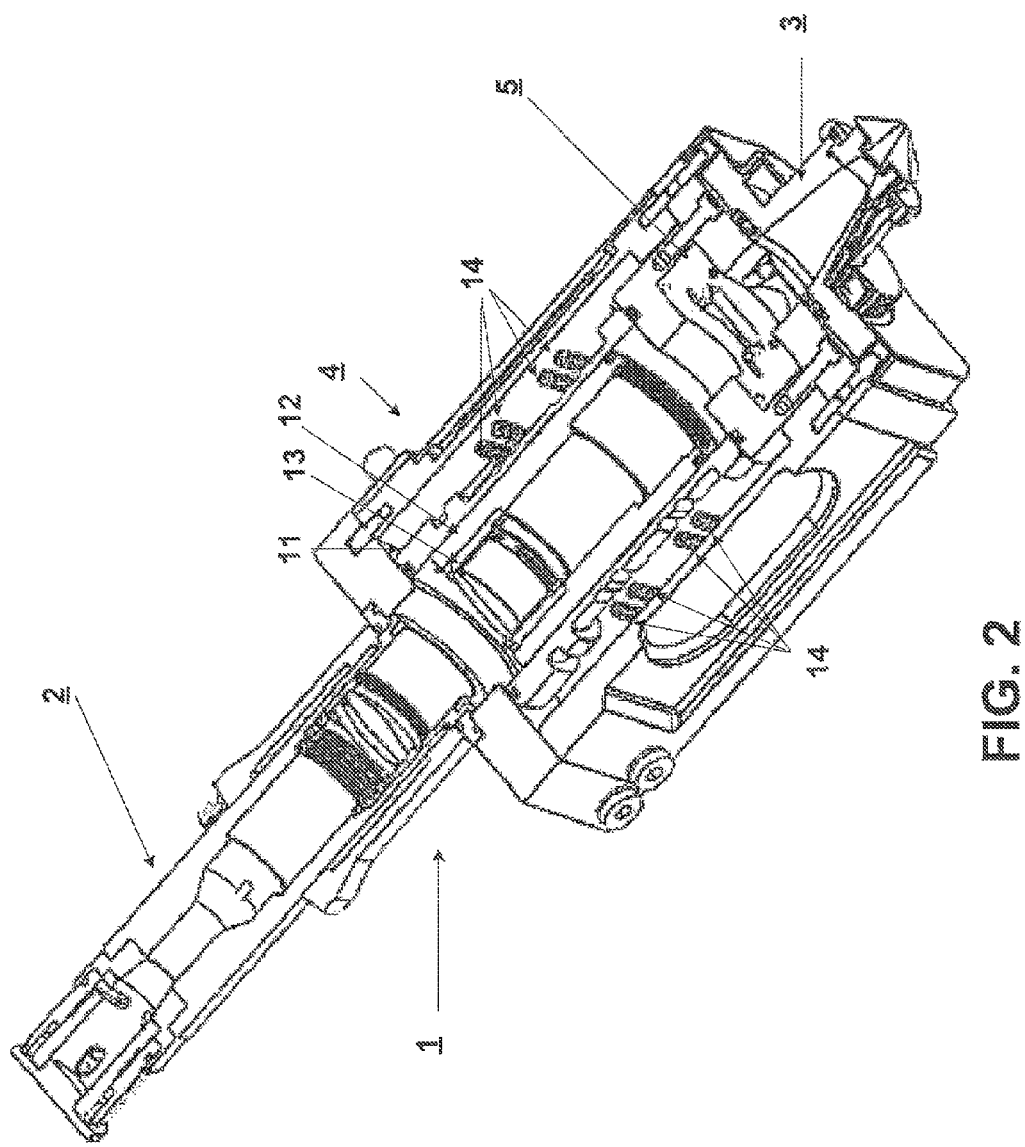
FIG. 2 is a perspective sectional view of the head assembly along Section 2-2 in FIG. 1
Figure 3:
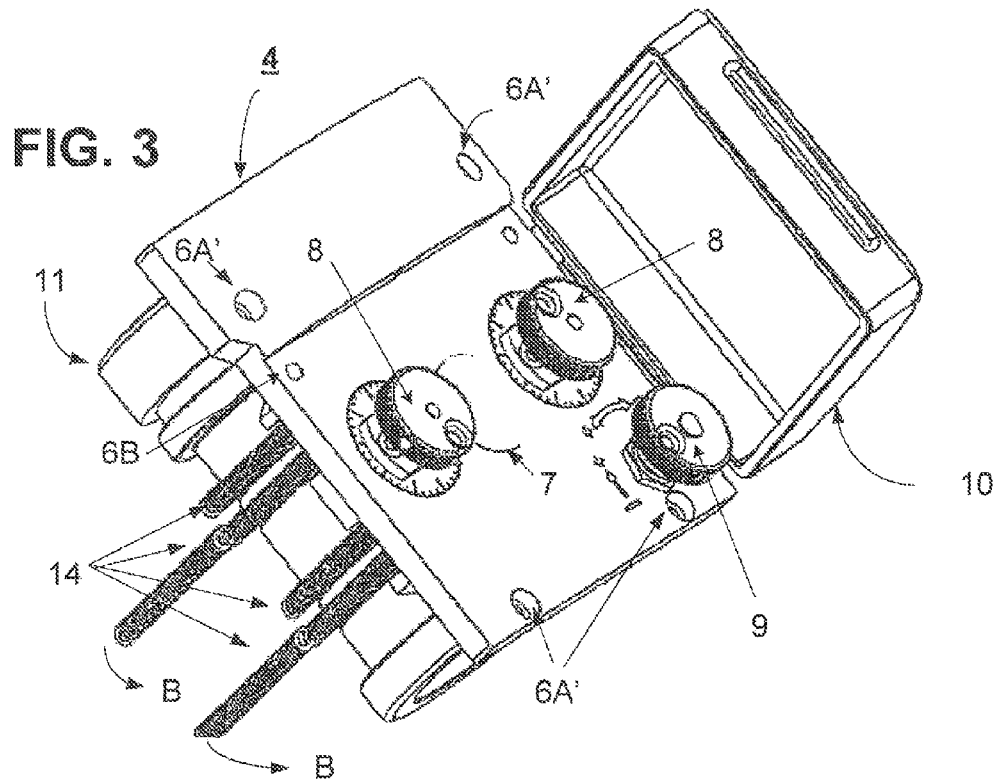
FIG. 3 is a perspective view of a focusing lens assembly for a laser processing system.

Referring now to FIGS. 1 to 3, an exemplary head assembly 1 is provided for a laser processing system, preferably a fiber laser processing system. An optical collimator assembly 2 is spaced from a nozzle assembly 3 by a focusing lens assembly 4 and a sliding window assembly 5. Window assembly 5 is outwardly slidable (arrows FIG. 1) from a housing of lens assembly 4 in an operatively sealed manner allowing a sealed replacement thereof.

Lens assembly 4 includes a monolithic cover plate 6 sealingly mountable on the housing via screws 6A passing through respective holes 6A' therethrough to engage walls of the housing, as shown. Optionally, one or more alignment pins (not shown) may extend upwardly from walls of the housing and engage alignment pin holes 6B on cover plate 6, as shown, providing repeatable easy alignment. It will be understood that alignment pins 6B may alternatively extend from cover plate 6.

A protective cover 10 is hingeably mounted on cover plate 6 as shown (note swing arrow) and provides protection for X-Y controls 8, 8 of an adjustment system (discussed later) fixed to an inner side of monolithic cover plate 6. Also provided is a focus control 9 for a focus adjustment system (discussed later). A sight window 7 is provided for a visual, but sealed, inspection of lens assembly elements as will be discussed. One or more reference scales relative to controls 8, 8, 9 are provided for convenience as shown.

It will be additionally understood, that head assembly 1 may be adaptively modified to receive internal sensor signals via an external process receiver/actuator 51 along digital pathways shown or from internal indicators (discussed later). Additionally, an alternative computerized process controller 52 is provided which may receive data signals from process receiver 51 and correspondingly may process and transmit digital adjustment or focusing instructions to automated adjustment or focusing systems (not shown). It will be understood in such adaptations that process controller 52 is provided with a suitably operative electronic memory, signal receivers, and operative data processors and transmitters as will be understood by those of skill in the art.

Figure 4:
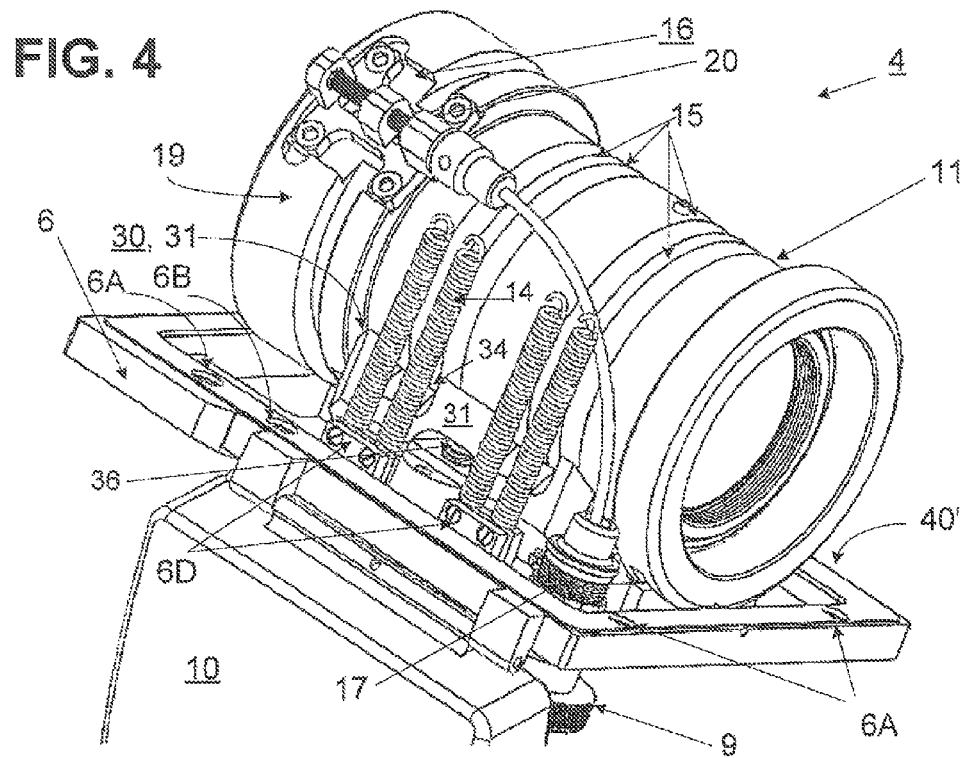
FIG. 4 is an inverted perspective view of the focusing lens assembly in FIG. 3.
Figure 5:
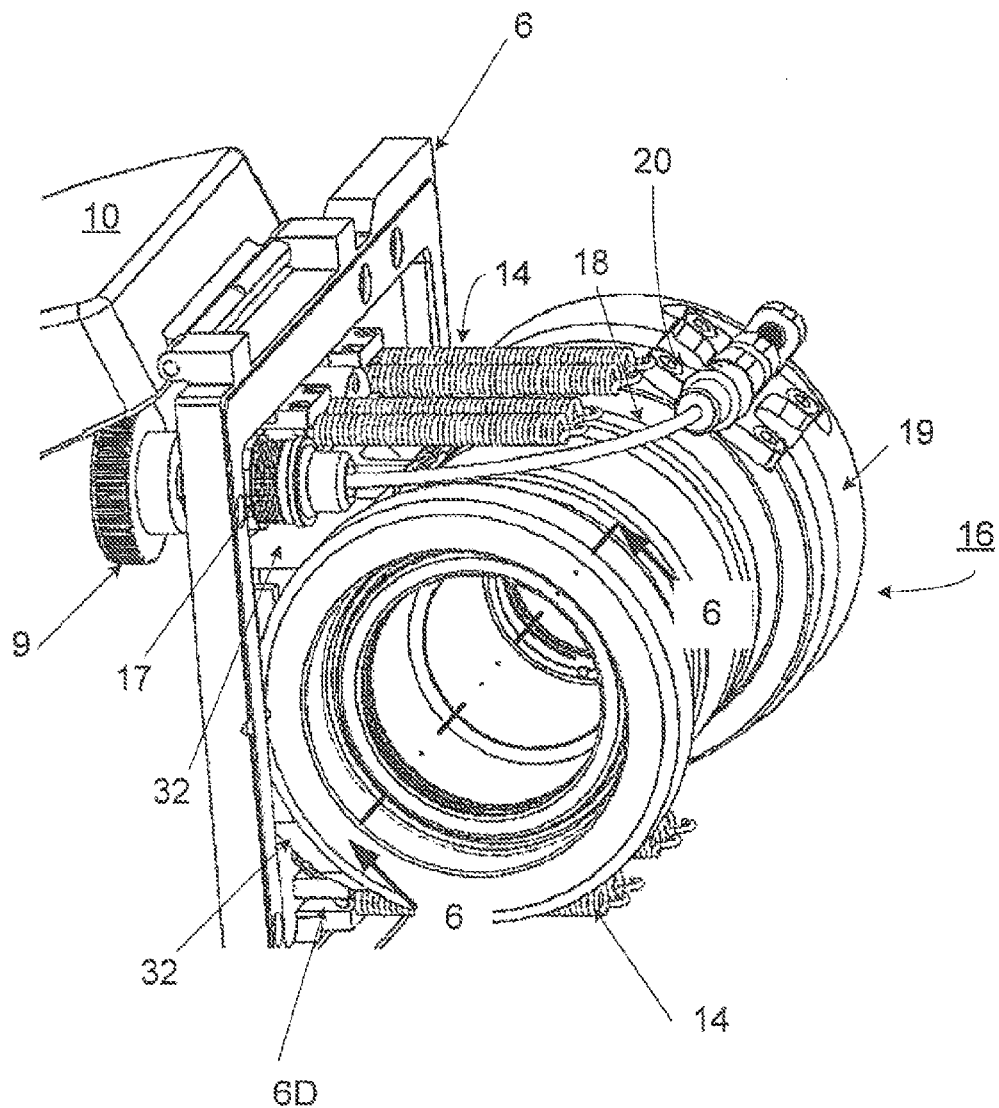
FIG. 5 is a further rotated perspective view of FIG. 4.

Viewing sectional view 2-2 in FIG. 1 provides visual access to the arrangement of a lens barrel 11 slidingly receiving a lens module 12 relative to the cover plate 6. A lens cell 13 is removably mounted in lens module 12, and is operative to allow easy replacement of different focal length lens, for example lenses of f125, f200, or f250 may be easily positioned and adjusted as will be discussed. A plurality of restraining and securing springs 14 wrap the outer surface of lens barrel 11 in spring grooves 15 (FIG. 4) and urge lens barrel 11 to cover plate 6, as will be discussed. Springs 14 shown in FIG. 3 are extended in directions B, B about lens barrel 11 and secured as will be discussed. Springs 14 in FIG. 3 are shown in the non-secured position for illustration ease.

Figure 6:
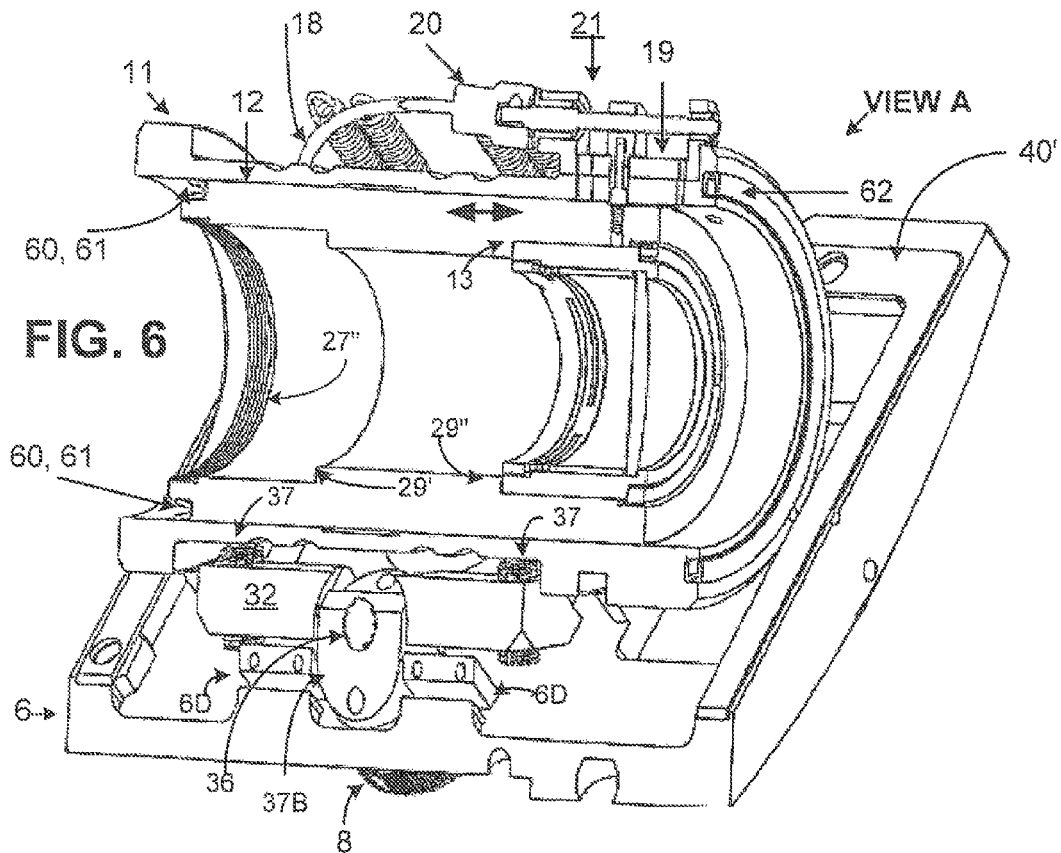
FIG. 6 is a perspective sectional-view along Section 6-6 in FIG. 5.
Figure 8:
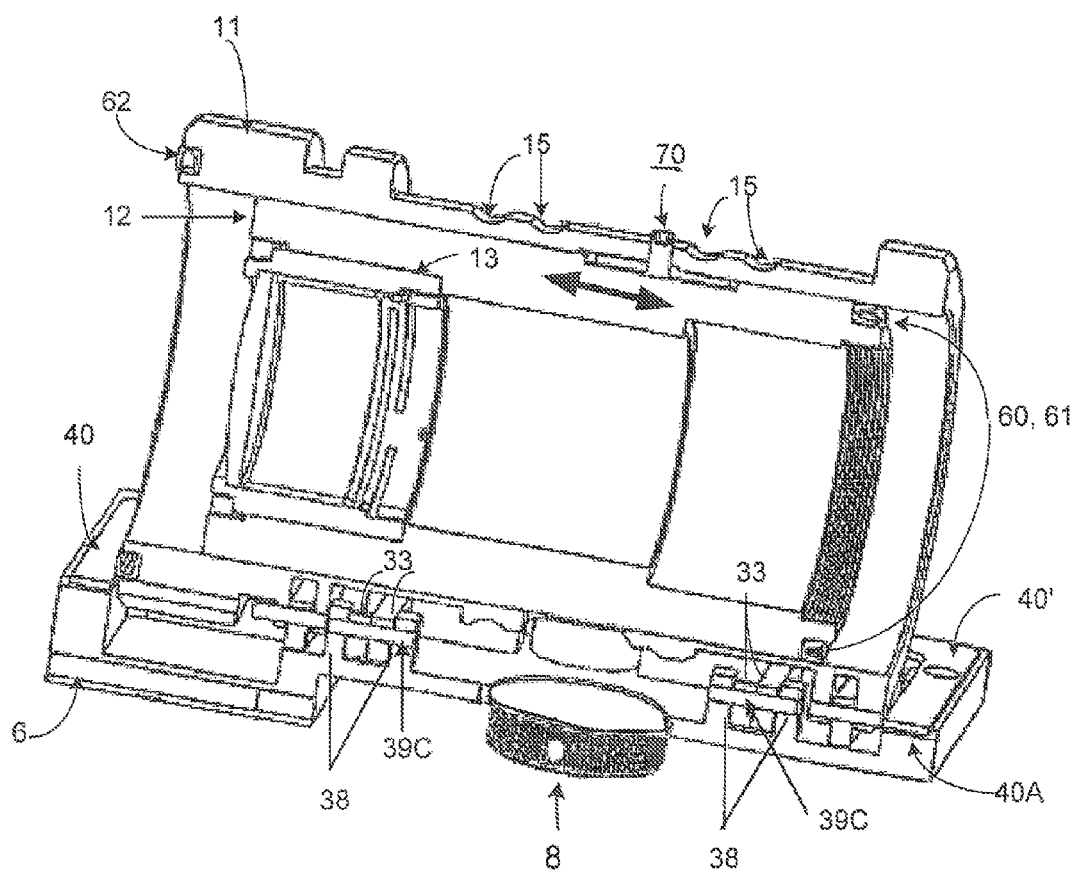
FIG. 8 is a modified partial perspective view of FIG. 7 in an inverted orientation noting pivot points for an adjustment system and alignment assembly elements restricting rotation of a lens module.
Figure 9:
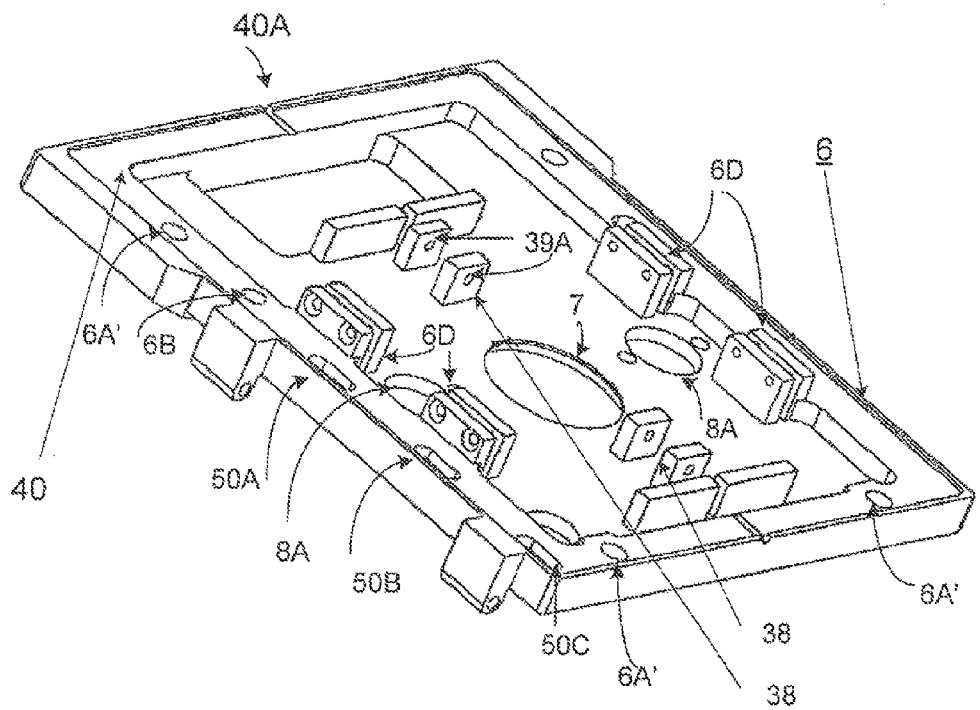
FIG. 9 is perspective view of the monolithic cover plate.
Figure 10:
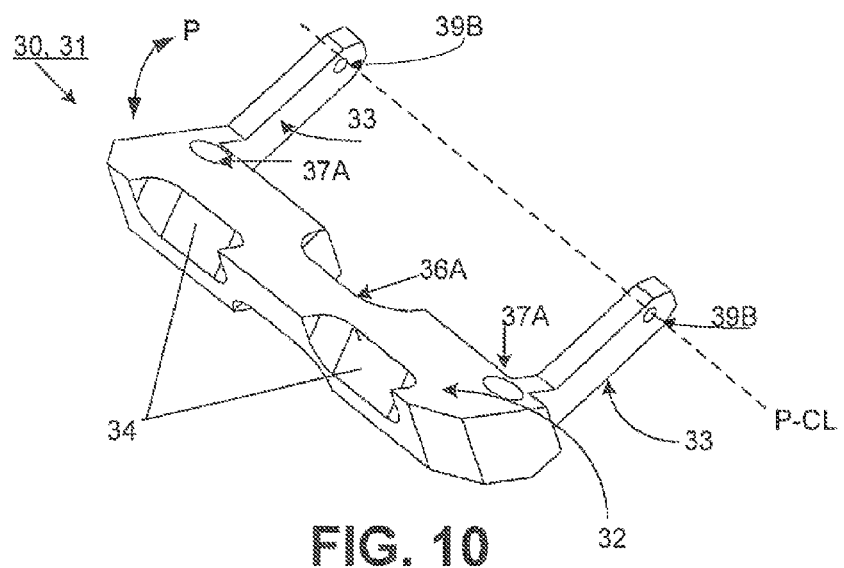
FIG. 10 is a perspective view of one pivot arm assembly in an adjustment system noting a singing pivot direction P relative to a pivot center line P-CL.

Referring now to FIGS. 3 through 10, focusing lens assembly 4 secures lens barrel 11 to cover plate 6 between the tension of springs 14 (shown fixed in respective spring mounts 6D but unsecured) riding in spring grooves 15 and opposing pivot anus 31, 31 in X-Y adjustment assembly 30. As will be discussed later, pivot anus 31, 31 each have barrel support surfaces 32 and co-pivoting swing arms 33, 33 along a single common pivot center line P-CL (FIG. 10). Each barrel support surface 32, 32 has respective alignment holes 37A, 37A on outer side thereof for threadably receiving respective alignment screws 37, 37 for surface contact with lens barrel 11 (FIG. 6). In this way, lens barrel 11 may be adjusted relative to each arm assembly to allow both parallel and slight X-Y axis alignment adjustment in a secure manner prior to initial installation.

Further, each X-Y control access 8, 8 controllably adjusts a respective drive screw 36 sealingly projecting through an opening 8A (FIG. 10) in cover plate 6 and threadably secured through a sealing bushing 37B (FIG. 6) fixed to cover plate 6 by bushing pins (shown but not numbered, FIG. 6). Each barrel support section 32, 32 has a respective drive screw bearing surface 36A on an underside thereof shaped to receive an end of drive screw 36 during a bearing contact use. In this manner, respective controls access 8, 8 are adjusted, and turn drive screws 36, 36 lifting swing arms along respective arcs P (FIG. 10) against restraining spring tension provided by springs 14. As a result, respective adjustment of screws 36, 36 shifts respective barrel supports 32 along urging contact via alignment screws 37 on an outer surface of lens barrel 11 shifting in an X-Y direction relative to a beam path through head assembly 1.

The outer edge of each respective pivot arm assembly 31 includes respective spring slots 34 proximate respective spring mounts 6D for springs 14. In this manner, pivot arm assemblies 31, 31 do not interfere with springs 14, during X-Y adjustment or focus adjustment, as will be discussed below.

Figure 7:
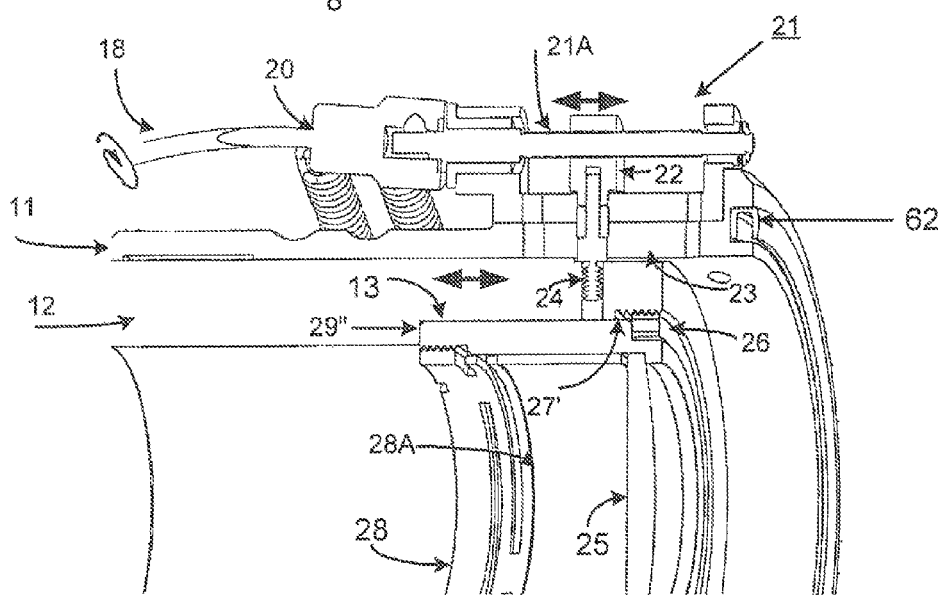
FIG. 7 is a close up of View A in FIG. 6.

A focus assembly or system 16 includes a sealed bushing 17 linking access 9 through a flexible drive 18 to a flex connector 20 for operating a rack drive assembly 21. Rack drive assembly 21 includes a rack screw 21A receiving a remote drive control from access 9 rotates relative to securing pinions as shown) and slidably drives a drive pin 22 along a slot 23 extending through both a focus collar 19 surrounding a portion of lens barrel 11 and a proximate portion of lens barrel 11 (see FIGS. 6-7). In this way, drive pin 22 translates axially relative to a beam path through focusing lens assembly 4 as shown by directional arrows (FIG. 7).

Lens module 12, extending within lens barrel 11 carries lens cell 13 as noted earlier. A portion of the outer surface of lens module 12 is accessible to slot 23 and includes a treaded connection hole 24 for operatively engaging a distal end of drive pin 22. In this way, axial translation of drive pin 22, translates lens module 12 in an axial direction to a beam path as shown by directional arrows (FIG. 7).

Lens module 12 contains a bounded inner surface for securely receiving removable lens cells 13. One or more stops 29', 29" enable positive receipt of different length lens cells 13 (a shorter one is shown in FIG. 6). Respective locking threads 27', 27" on either end of the inner surface of lens module 12 allow securing different length lens cells. Here, lens cell 13 includes a lens 25 on a lip edge and a spring spacer 28A and threaded spring 28 held in a threaded engagement between a spring nut 28 and an engaging inner threads of lens cell 13, as shown. A threaded locking ring 26 secures lens cell 13 to locking thread 27' and secures lens cell in lens module 12.

On a distal lip of lens module 12 a v-shaped seal 60 includes a stainless steal insert 61 and slidingly seals lens module 12 along an inner surface of lens barrel 11 during a focus adjustment. The arrangement of seal 60 and insert 61 adds a preloading function to the seal and aids centering of lens module 12 during adjustment.

An outer scaling ring 62 retained in a recess on a proximate face of lens barrel 11 (FIGS. 6, 7, and 8) allows a sliding sealing with elements of head assembly 1 during a sliding insertion or removal of focusing lens assembly 4 relative to a beam path.

Additional, an optional sliding alignment arrangement 70 (FIG. 8) includes an alignment opening in lens barrel 11 for threadably receiving an alignment pin in a sliding arrangement along a guiding slot (not numbered, all shown in FIG. 8). In this manner, more than one sliding alignment and non-rotation arrangement is operatively provided in focusing lens assembly 4.

In FIGS. 9 and 10, the inner arrangement of cove plate 6 is illustrated. An outer sealing continuous groove 40 contains a continuous seal 40' (FIGS. 4, 5, 6, and 8) enabling a complete operative pressure seal of lens barrel 11 and related inner focus mechanism or system 16 following assembly. Hinge mounts 38, 38 project from an inner surface of cover plate 6, have two legs as shown and define a space there between. The ends of respective swing arms 33, 33 of respective pivot arm assemblies 31 overlap and next within the legs of each binge mount 38 as shown in a manner such that pivot holes in each arm 39B (as shown) align with pivot holes 39A in each leg of each hinge mount 38 along a common pivot center line P-CL (FIG. 10) enabling insertion of coaxial pivot pings 39C. To accommodate an insertion of respective pivot its 39C, 39C from opposing sides of cover plate 6, respective pin groves 40A, 40 provide a pin press access which is later sealed by the flex of cover gasket 40' following installation.

Along an inner surface of cover plate are a series of recesses 50A, 50B, and 50C proximate the continuous sealing groove 40 and coverable by continuous seal 40' during an assembly. Recesses 50A, 50B, and 50C are positioned for operative receipt of either specific sensors (not shown), or magnetic sensors operative to detect one or both of a particular type of lens cell 13 installed in lens module 13 and one or both of a movement of lens module 12 and lens cell 13 relative to cover plate 6. In any arrangement, sensors in the respective recess are operative to transmit data signals to process sensor arrangement 51, and thence to remote process controller 52 enabling a digital feed back. Thus, in one alternative arrangement of the present invention via process feed back a computer control of an adjustment assembly and a focus assembly.

It will be understood that the phrase monolithic, as used to discuss cover door 6, is used to illustrate a continuous (atmospherically sealable) cover plate. In this way, cover plate 6 allows for gaseous cooling of focusing lens assembly 4, under a suitable operational pressure while preventing contamination. Similarly, the term monolithic does not prohibit openings therein to accommodate scaled openings, windows, or adjustment controls provided that the cover plate is operative for sealing.

It will be further understood that head assembly 1 may be modified to provide additional cooling systems, sensor monitoring systems, computer controlled adjustment and focus systems, or atmospheric control systems (all not shown) without departing from the scope of the present invention.

It will be further understood that one or more computer process units/control units (CPU's) may provide integrated system management and control with respective laser system components. For example, while not shown, each proposed embodiment may be optionally integrated with one or more CPUs.

It will be further understood, that the proposed head assembly may be used as both a cutting head and optionally as a welding head with suitable operable modifications. In any use, it will also be recognized that surfaces that receive operations environment exposure may be coated for smooth appearance, durable use, or non-adherence of weld or cutting spatter. Any suitable materials may be used, metal, ceramics, glasses, crystallographic or amorphous, without departing from the scope of the present invention.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed:

1. A head assembly for a laser processing system, comprising:
an operative lens assembly interposed along a beam path of said laser;
a monolithic cover plate securing said operative lens assembly in a sealed arrangement with a bounded lens receiver bounding said beam path;
an adjustment system operative to adjust said lens assembly along a direction transverse to said beam path in said sealed arrangement therewith, said adjustment system being configured with a first and second pivot arm pivotally secured to said cover plate about a common pivot axis parallel to said beam path;
a focus system operative to focus said lens assembly in an axial direction parallel to said beam path in said sealed arrangement; and
wherein said lens assembly includes a lens barrel in a relative sliding arrangement with a lens module replaceably securing a lens cell in said beam path said lens barrel being configured with a plurality of sections, and
wherein the adjustment system is further configured with a plurality of alignment screws threadedly mounted to respective barrel sections and operable to align said lens barrel relative to said barrel sections along respective pivot arms and parallel to said beam path.

2. A head assembly, according to claim 1, wherein:
a plurality of springs releasably urging said lens barrel toward said cover plate and into an urged contact along a barrel support section on each respective said pivot arm.

3. A head assembly, according to claim 1, wherein:
said means for remotely pivoting includes means for remotely driving at least one of said respective barrel supports about said common pivot axis in said sealed arrangement and operative to drive said lens assembly relative to said beam path.

4. A head assembly, according to claim 1, wherein:
said focus system further comprises:
a drive rack assembly fixed on a surface of said lens barrel;
said drive rack assembly operative to drive a pin extending from said drive rack assembly through a translation slot in said lens barrel in a sliding direction along said beam path; and
said pin releasably secured to said lens module effective to transfer a translation of said pin sliding to said lens module thereby translating said lens module along said beam path in a focus direction therewith.

5. A head assembly, according to claim 4, further comprising:
means for remotely driving said drive rack assembly external to said bounded lens receiver in said sealed arrangement.

6. A head assembly, according to claim 5, wherein:
said means for remotely driving further comprises:
a sealed bushing assembly for operative translation of a remote driving motion along a flex drive member to a flex connector on said drive rack assembly.

7. A head assembly, according to claim 1, further comprising:
- at least one step on an interior of said lens module for receiving said lens cell thereon during an assembly;
- at least one internal locking thread on said interior of said lens module associated with said at least one step for retaining said lens cell therebetween; and
- a locking ring threadably engaging said internal locking threads to secure said lens cell between said at least one step and said lens module.

8. A head assembly, according to claim 7, further comprising:
- an operative lens in said lens cell proximate a retaining lip;
- an internal threading on an inner surface of said lens cell; and
- an operatively releasable urging nut elastically urging said operative lens into a retaining contact with said retaining lip effect to secure said lens relative to said lens module during a use of one of said adjustment system and said focus system.

9. A head assembly, according to claim 1, further comprising:
- at least one slide alignment system slidingly guiding said lens module relative to said lens barrel and preventing a relative rotation therebetween.

10. A head assembly, according to claim 1, further comprising:
- a lens module seal in an operative sliding arrangement between said lens barrel and said lens module.

11. A head assembly, according to claim 1, further comprising:
- at least one position sensor operative to sense one of a location of said lens module and a location of said lens cell relative to said lens barrel; and
- said at least one position sensor operative to generate a position signal relievable at an external control processor during said sealed arrangement.

12. A head assembly, according to claim 1, further comprising:
- digital control means operative to drive at least one of said adjustment system and said focus system and effective to position said lens assembly relative to said beam path; and
- said digital control means including an external control processor creating digital adjustment signals to adjust said lens assembly through said digital control means.

13. A head assembly, according to claim 1, further comprising:
- a collimator system operatively and releasably sealed to an upstream side of said operative lens assembly;
- a window assembly system operatively and removably sealed along a downstream side of said operative lens assembly; and
- a nozzle assembly sealing secured along a downstream side of said window assembly system, whereby said beam pass passes from said collimator system through said nozzle assembly during a use of said laser processing system.

\* \* \* \* \*